US010132397B2

(12) United States Patent
Desch et al.

(10) Patent No.: US 10,132,397 B2
(45) Date of Patent: Nov. 20, 2018

(54) DRIVING DEVICE AND WORK MACHINE DEVICE

(71) Applicant: DESCH ANTRIEBSTECHNIK GMBH & CO. KG, Arnsberg (DE)

(72) Inventors: Hendrik Peter Desch, Arnsberg (DE); Uwe Geilker, Arnsberg (DE); Bernhard Plattfaut, Hamm (DE); Udo Winiarski, Balve (DE)

(73) Assignee: DESCH Antriebstechnik GmbH & Co. KG, Arnsberg (DE)

( * ) Notice: Subject to any disclaimer, the term of this patent is extended or adjusted under 35 U.S.C. 154(b) by 735 days.

(21) Appl. No.: 14/397,255

(22) PCT Filed: Apr. 12, 2013

(86) PCT No.: PCT/EP2013/057710
§ 371 (c)(1),
(2) Date: Oct. 27, 2014

(87) PCT Pub. No.: WO2013/160127
PCT Pub. Date: Oct. 31, 2013

(65) Prior Publication Data
US 2015/0133246 A1    May 14, 2015

(30) Foreign Application Priority Data
Apr. 25, 2012   (DE) .................. 10 2012 008 105

(51) Int. Cl.
*F16H 7/02*    (2006.01)
*B02C 13/30*    (2006.01)
(Continued)

(52) U.S. Cl.
CPC ............. *F16H 47/02* (2013.01); *B02C 13/30* (2013.01); *F16H 7/02* (2013.01); *F16H 37/00* (2013.01);
(Continued)

(58) Field of Classification Search
CPC .. F16H 47/02; F16H 57/0439; F16H 57/0441; F16H 7/02; F16H 61/0031;
(Continued)

(56) References Cited

U.S. PATENT DOCUMENTS 2,734,722 A  *  2/1956  Pokorny ............... E21B 19/087
                                                173/184
4,319,500 A    3/1982  Horn
(Continued)

FOREIGN PATENT DOCUMENTS

CN    102123793 A    7/2011
CN    201915961 U    8/2011
(Continued)

OTHER PUBLICATIONS

English Translation of Description of FR2651292 A1 dated Mar. 1, 1991.*
(Continued)

*Primary Examiner* — Nathan Zollinger
(74) *Attorney, Agent, or Firm* — Laurence A. Greenberg; Werner H. Stemer; Ralph E. Locher (57) ABSTRACT

A drive device having a main drive device, a gearing, a switchable clutch, at least one hydraulic pump, and a gearing output shaft is started with low wear by providing an auxiliary drive to drive the gearing output shaft independently of the main drive device. A work machine device includes the drive device and a work machine which can be started accordingly in a low-wear manner and which enables longer-term operation in the reverse direction of rotation. Corresponding methods which are also provided in connection with the drive device and the work machine device, enable low-wear starting and the elimination of undesired operating states.

19 Claims, 8 Drawing Sheets

(51) Int. Cl.
*F16H 47/02* (2006.01)
*F16H 37/00* (2006.01)
*F16H 57/04* (2010.01)
*B60W 20/40* (2016.01)

(52) U.S. Cl.
CPC ......... *F16H 57/0439* (2013.01); *B60W 20/40* (2013.01); *F16H 57/0441* (2013.01); *Y10T 74/19014* (2015.01); *Y10T 477/27* (2015.01)

(58) Field of Classification Search
CPC ....... F16H 37/00; B60W 20/40; B60W 10/02; B60W 10/04; B02C 13/30; B02C 4/42; B02C 7/188; B02C 17/24; B02C 18/24; B02C 18/38; Y10T 74/19014; Y10T 477/27
USPC .............................. 74/413; 241/101.2, 36, 37
See application file for complete search history.

(56) References Cited

U.S. PATENT DOCUMENTS

| | | | | |
|---|---|---|---|---|
| 6,048,288 A | * | 4/2000 | Tsujii | B60H 1/3222 180/65.25 |
| 8,678,307 B2 | | 3/2014 | Rittler | |
| 9,010,467 B2 | * | 4/2015 | Burnier | B60K 25/06 180/53.1 |
| 2009/0314559 A1 | * | 12/2009 | Palitto | B60K 5/08 180/65.22 |
| 2010/0147644 A1 | | 6/2010 | Grogg et al. | |
| 2011/0114770 A1 | | 5/2011 | Frangenberg | |

FOREIGN PATENT DOCUMENTS

| | | | | |
|---|---|---|---|---|
| CN | 102186592 A | | 9/2011 | |
| CN | 102256826 A | | 11/2011 | |
| DE | 3416506 A1 | | 12/1984 | |
| DE | 3426083 C1 | * | 10/1985 | ............ B02C 13/30 |
| EP | 2317097 A2 | | 5/2011 | |
| FR | 2651292 A1 | * | 3/1991 | ............ B60K 17/06 |
| GB | 2142555 A | | 1/1985 | |

OTHER PUBLICATIONS

English Translation of Description of DE3426083 dated Oct. 17, 1985.*

* cited by examiner

DRIVING DEVICE AND WORK MACHINE DEVICE

BACKGROUND OF THE INVENTION

Field of the Invention:

The present invention relates to a drive device having a main drive device, a hydraulic pump, at least one switchable clutch and a gearing with a first drive output and at least one second drive output, wherein the main drive device is configured to drive the gearing, the first drive output of the gearing is configured to drive the at least one hydraulic pump, the second drive output of the gearing is configured as a gearing output shaft for driving a work machine, and the switchable clutch is connected upstream of the gearing output shaft. The invention also relates to a work machine device having a drive device and a work machine. The invention furthermore relates to a method for bringing a drive device from a rest state into an operating state, to a method for bringing a work machine device from a rest state into an operating state, and to a method for eliminating undesired operating states.

A generic drive device generally serves for driving a work machine, for example a construction machine, in this case in particular a crushing machine. As main drive means, use is preferably made of a diesel engine.

A work machine device comprises substantially a drive device and a work machine, for example a crushing machine. Overall, the work machine device can thus be designed for example as a construction machine.

A disadvantage of such drive devices or work machine devices is the loading, in particular thermal loading, of the switching clutch during the start-up process.

BRIEF SUMMARY OF THE INVENTION

The present invention addresses this and has the object of providing an improved drive device of the above-mentioned type, in particular a drive device of the above-mentioned type, the switching clutch of which is subjected to lower loading, in particular lower thermal loading, during the start-up process.

According to the invention, said object is achieved by means of a drive device which is equipped with an auxiliary drive configured for driving the gearing output shaft. By virtue of the fact that the drive device is equipped with an auxiliary drive, wherein the auxiliary drive is designed for driving the gearing output shaft independently of the main drive means, it is possible in particular to implement the following advantageous start-up process:

To bring the drive device from the rest state into the operating state, it is possible firstly for the main drive means to be started. The switchable clutch is firstly opened. The main drive means can subsequently be run up to the activation rotational speed (for example idle rotational speed, "elevated" idle rotational speed, or the like) of the switchable clutch. In this state, the auxiliary drive, which may be designed in particular as a hydraulic motor, can be driven by one of the hydraulic pumps. The auxiliary drive can accelerate the gearing output shaft independently of the main drive means of the drive device itself. When the auxiliary drive has accelerated the gearing output shaft up to the intended rotational speed, the activation rotational speed, the switchable clutch can be activated. At the same time or approximately at the same time, the auxiliary drive can be deactivated. The switchable clutch can synchronize the already-rotating mass of the gearing output shaft, and in particular the rotating mass of the work machine connected to the gearing output shaft, with the rotational speed of the main drive means. Since said rotational speed difference will be small or approaches zero, the switchable clutch is subjected to no thermal loading whatsoever or only low thermal loading. When the rotational speeds have synchronized, the main drive means can be run up to its operating rotational speed. The auxiliary drive has already been deactivated or separated from the gearing output shaft.

Further advantageous refinements of the proposed invention will emerge in particular from the subclaims. The features of the subclaims may basically be combined with one another as desired.

In one advantageous refinement of the drive device according to the invention, it may be provided that the auxiliary drive is designed for being operated selectively in a first direction of rotation and in a second, opposite direction of rotation, in particular is designed to run both forwards and backwards. A drive device designed in this way yields numerous advantages. Running forward, the auxiliary drive can implement the start-up process discussed above. Running backward, it is for example possible for undesired operating states, in particular jamming of a connected work machine, to be eliminated. Furthermore, the auxiliary drive serves for relatively long-term operation in an opposite direction of rotation for a production process in a reverse direction of rotation.

In a further advantageous refinement of the drive device according to the invention, it may be provided that the auxiliary device is designed as a hydraulic motor, pneumatic motor or electric motor. All of the above-mentioned types of drives are advantageously suitable as an auxiliary drive, in particular because their direction of rotation is reversible and it is basically possible to adjust to predetermined rotational angle positions of the drive output shaft of the hydraulic motor or electric motor. Said auxiliary drives generally provide torque even at a rotational speed of 0 rpm. They are thus suitable inter alia for starting processes. Furthermore, their direction of rotation is controllable; that is to say it is possible to realize anticlockwise and also clockwise running. Furthermore, the rotational speed is adjustable. Other types of auxiliary drives that do not imperatively have the above-mentioned characteristics are also conceivable.

In a further advantageous refinement of the drive device according to the invention, it may be provided that the auxiliary drive can operate selectively as a hydraulic motor or as a hydraulic pump. The hydraulic motor, after having performed its function as an auxiliary drive, may be subjected to different hydraulic function such that it can operate as an additional hydraulic pump. In this way, it is possible for a further hydraulic pump to be dispensed with, and ultimately for costs and structural space to be saved.

In a further advantageous refinement of the drive device according to the invention, it may be provided that the main drive means is in the form of a diesel engine or electric motor. The above-mentioned drives basically provide enough power to be suitable as a main drive. The advantages of the drive device proposed here come to bear with particular effect in conjunction with the use of a diesel engine. The direction of rotation of the drive output shaft of a diesel engine basically cannot be changed. Nevertheless, changes in direction of rotation of the transmission output shaft can be performed by way of the auxiliary drive. The diesel engine, as main drive, serves in effect to impart the regular drive, with relatively high power, of the gearing output shaft, and thus of the downstream work machine, in the main direction of rotation. Aside from the run-up of the drive device with low wear, the auxiliary drive can, by way of the forward and backward running, rotate the gearing output shaft in a direction of rotation opposite to the main direction of rotation, and thus for example cancel out disturbances in the work machine connected downstream. Furthermore, the auxiliary drive can in effect rotate the gearing output shaft to a predetermined angular position or perform only a few slow rotations.

In a further advantageous refinement of the drive device according to the invention, it may be provided that the drive device is equipped with at least one further hydraulic pump which can be driven by way of the gearing. By means of the further hydraulic pumps, it is possible for a supply to be provided correspondingly to further consumers. In the case of a crushing machine, these may for example be hydraulically foldable funnel walls, locking devices for the feeding unit, hydraulic or hydraulically assisted gap adjustment, hydraulically lowerable rescreening unit and traction drives.

In a further advantageous refinement of the drive device according to the invention, it may be provided that the hydraulic pump or hydraulic pumps can be selectively activated and deactivated by way of switchable clutches. By means of this measure, it is possible substantially to ensure a supply to connected consumers in accordance with demand, for example by virtue of hydraulic pumps that are not required being deactivated, whereby ultimately energy can be saved and unnecessary wear of the hydraulic pumps can be reduced.

In a further advantageous refinement of the drive device according to the invention, it may be provided that an elastic coupling is arranged between the main drive means and the gearing. The elastic coupling has substantially both the function of a "damping coupling" and the function of a "compensation coupling". The objectives thereof are thus those of dampening vibrations in the circumferential direction (torque peaks) and compensating alignment errors between the main drive means and gearing. If vibrations are damped, this leads to lower mechanical loading of the torque-transmitting components. This has the result that a longer service life is achieved or the components can be made lighter and/or thinner. If alignment errors are compensated with low restoring forces, this leads to lower loading of, for example, bearings and shafts. A longer service life is achieved in this way too.

In a further advantageous refinement of the drive device according to the invention, it may be provided that the drive device is equipped with a reversing device for the main drive means, which reversing device is designed to allow the gearing output shaft to rotate in different directions of rotation in the case of an unchanging direction of rotation of the main drive means. The advantage in this arrangement lies in the fact that the full power of the main drive can be utilized for the work machine, in particular the crushing machine or the crushing process, because the crushing machine is mechanically driven in both directions of rotation. Since no conversion of energy takes place, in particular fuel energy into hydraulic energy, there are no further losses here aside from the losses in the gearing; that is to say the good efficiency of the gearing is achieved even during the production process in the reverse direction of rotation.

It is a further object of the present invention to provide an improved work machine device having a drive device and a work machine in particular a work machine device with lower loading of the switching clutch, in particular thermal loading, during the start-up process.

According to the invention, said object is achieved by means of a work machine device according to the invention.

Figure 1:
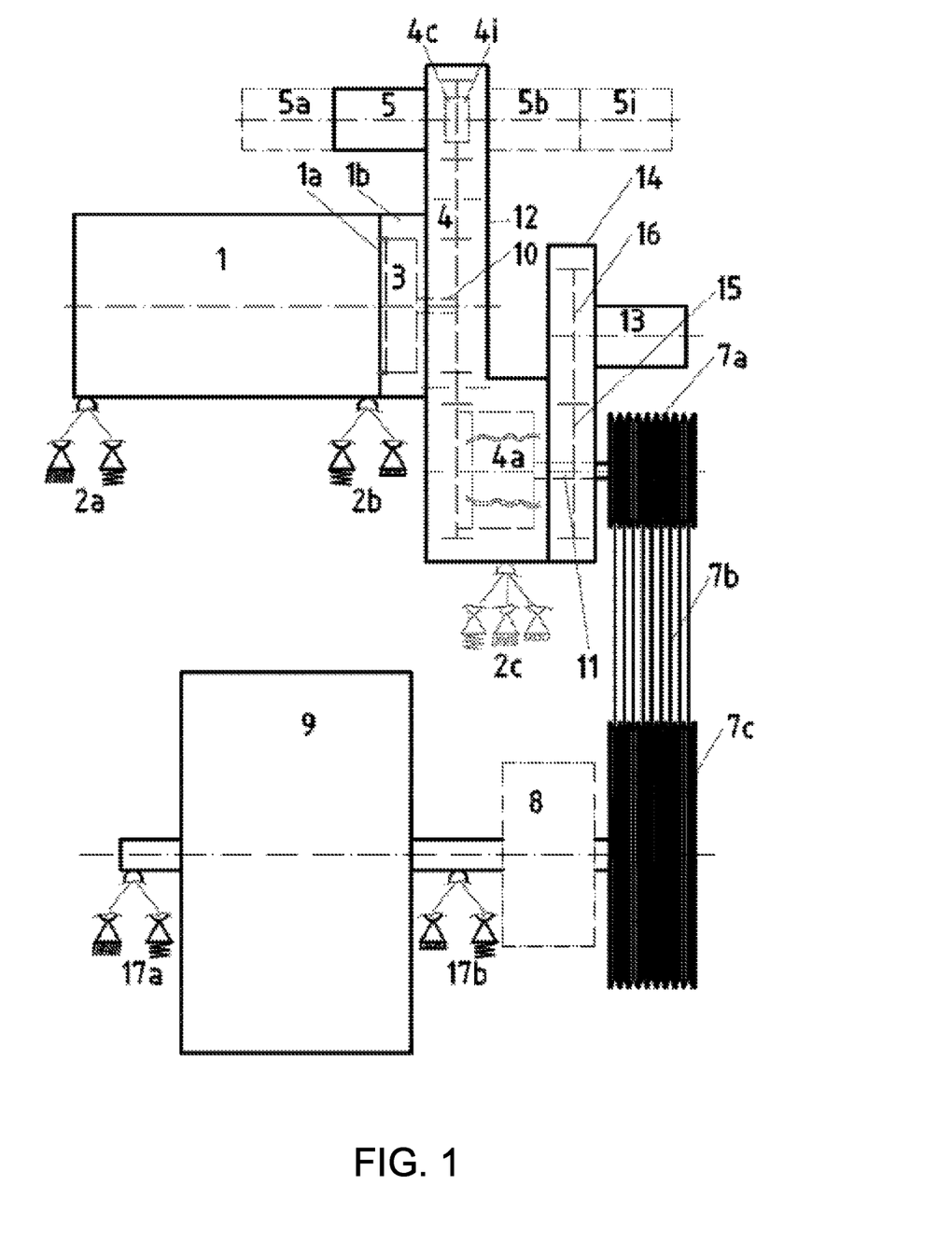
FIG. 1 shows a work machine device according to the invention having a drive device according to the invention in a schematic illustration in a view "from above"
Figure 1A:
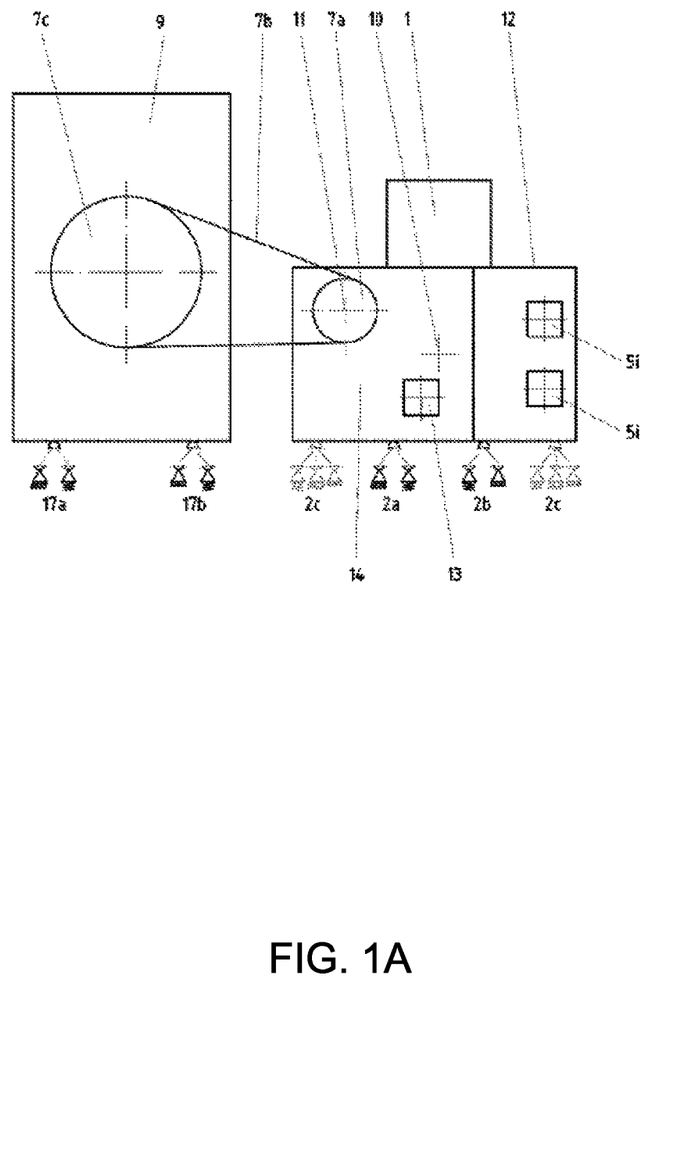
FIG. 1a shows a work machine device according to the invention having a drive device according to the invention in a schematic illustration in a view "from the front"
Figure 2:
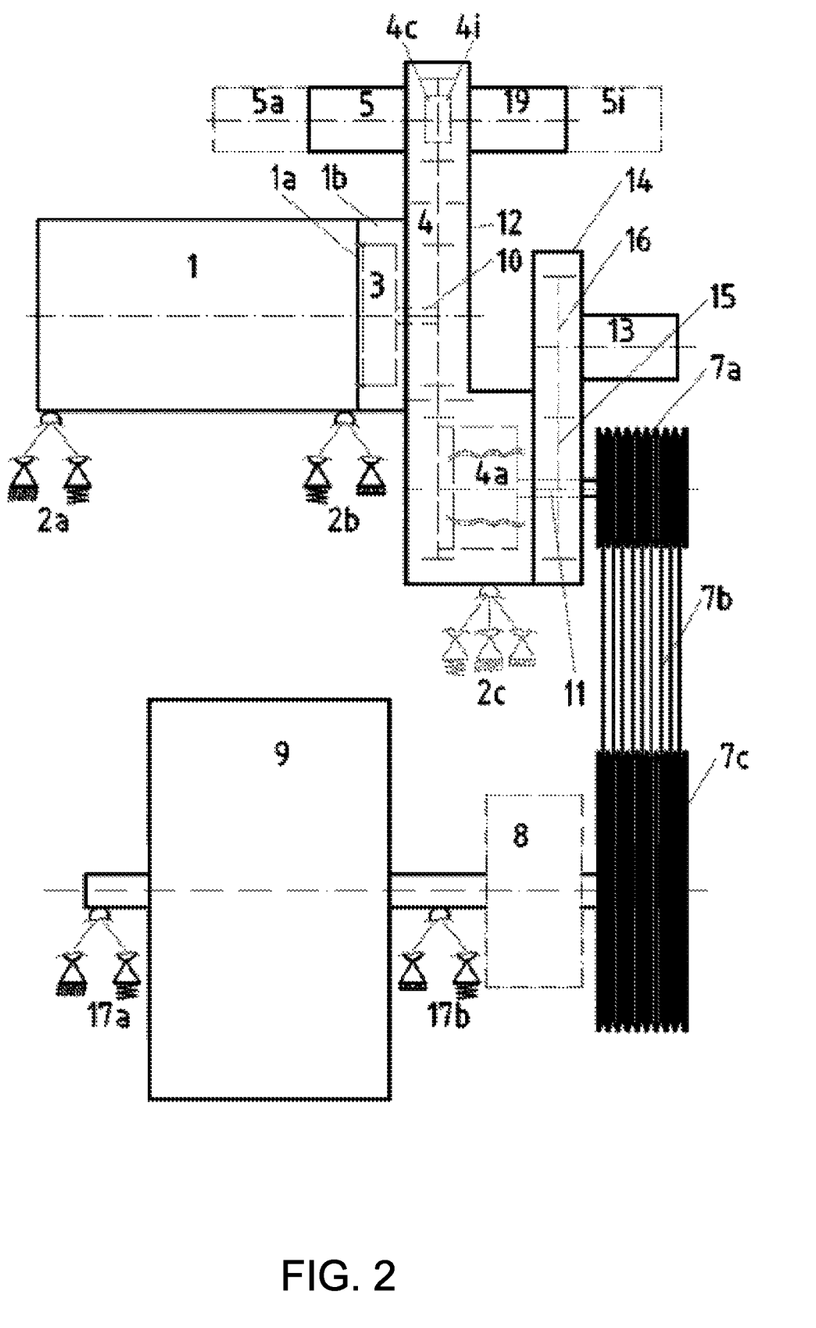
FIG. 2 shows a drive device according to the invention in a schematic illustration in a view "from above"
Figure 2A:
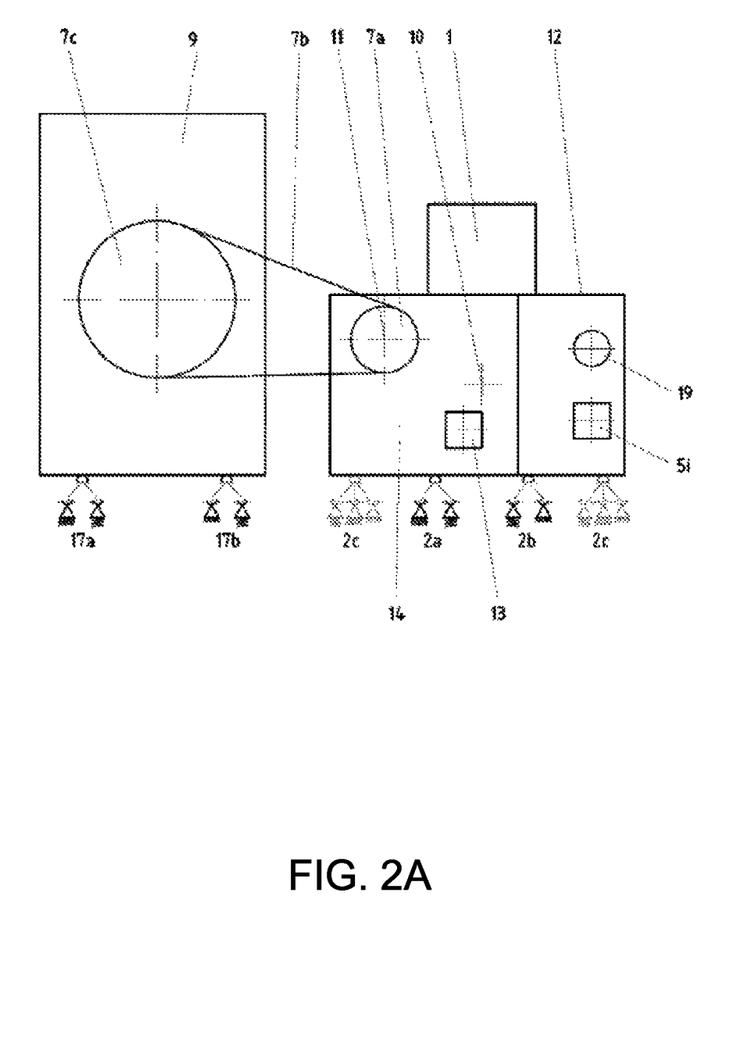
FIG. 2a shows a drive device according to the invention in a schematic illustration in a view "from the front"

By virtue of the fact that the drive device is a drive device according to the invention, it is possible in particular to implement the following advantageous starting process. The statements relate initially to the starting process with a work machine device as per FIGS. 1 to 2a, that is to say with a switchable clutch 4a upstream of the gearing output shaft:

To bring the work machine device from the rest state into the operating state, it is possible firstly for the main drive means, in particular the diesel engine, to be started. The switchable clutch is initially open. The main drive means can subsequently be run up to the activation rotational speed (for example idle rotational speed, "elevated" idle rotational speed, or the like) of the switchable clutch. In this state, the auxiliary drive, which may in particular be in the form of a hydraulic motor, is driven by one of the hydraulic pumps. The auxiliary drive can accelerate the work machine, from the output shaft of the gearing onward, with all components situated in between. The work machine may for example be designed as a crushing machine. When the auxiliary drive, in particular the hydraulic motor, has accelerated the gearing output shaft to the intended rotational speed, the activation rotational speed, the switchable clutch can be activated. At the same time, the auxiliary drive can be deactivated. The switchable clutch can synchronize the already-rotating masses, from the gearing output shaft onward, with the motor rotational speed. Since said rotational speed difference is small or approaches zero, the switchable clutch is subjected to no thermal loading whatsoever or only low thermal loading. When the rotational speeds have synchronized, the main drive means can be run up to its operating rotational speed. The auxiliary drive can be decoupled.

Figure 3:
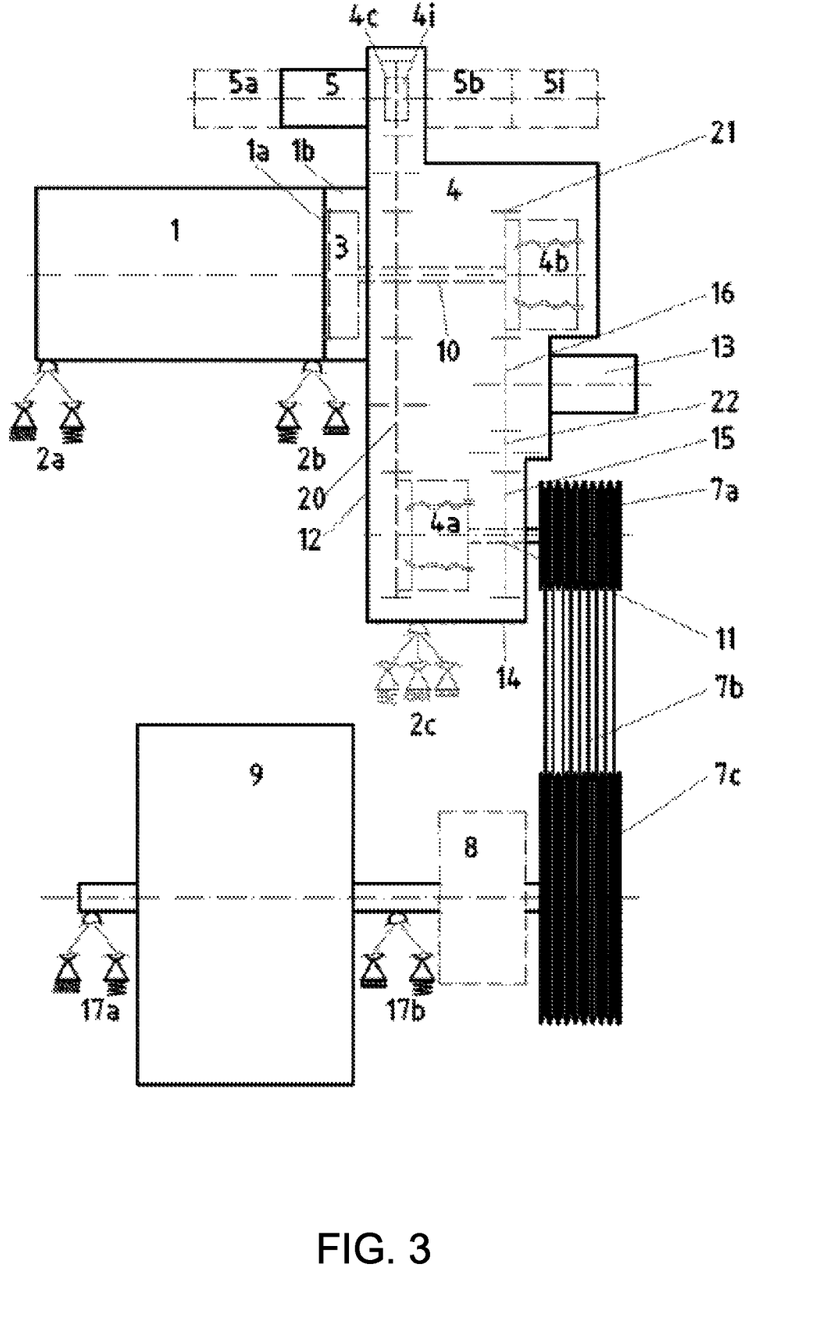
FIG. 3 shows a drive device according to the invention in a schematic illustration in a view "from above"
Figure 3A:
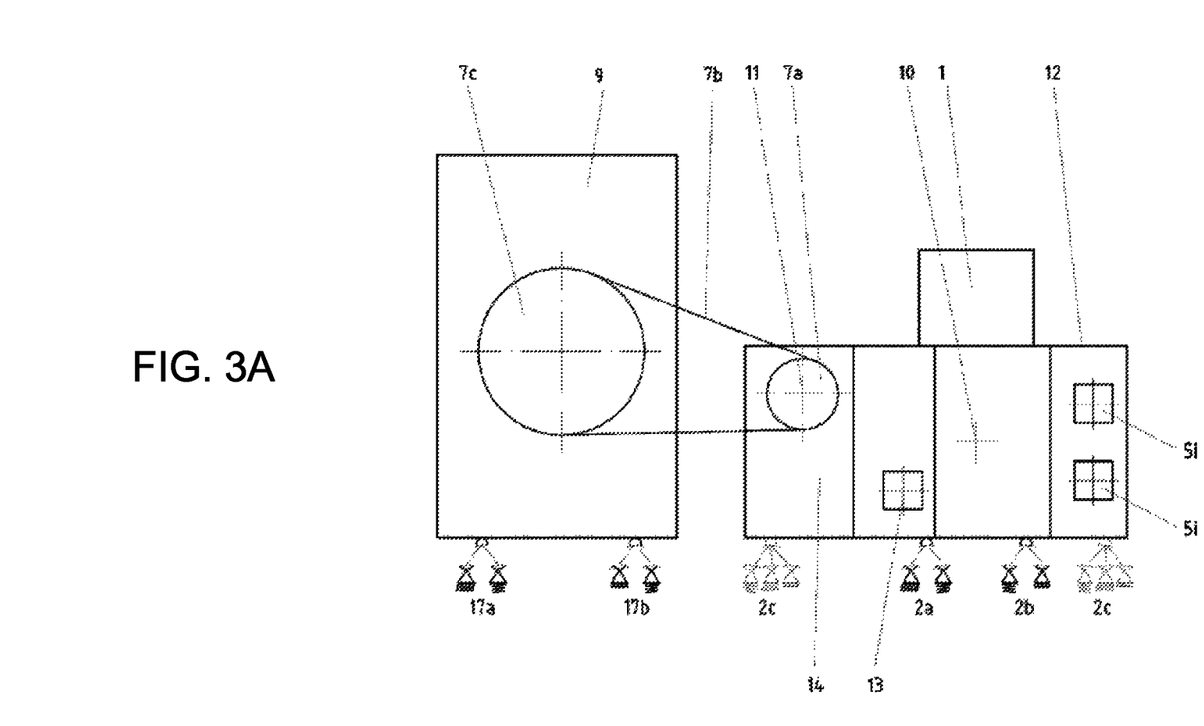
FIG. 3a shows a drive device according to the invention in a schematic illustration in a view "from the front"
Figure 3B:
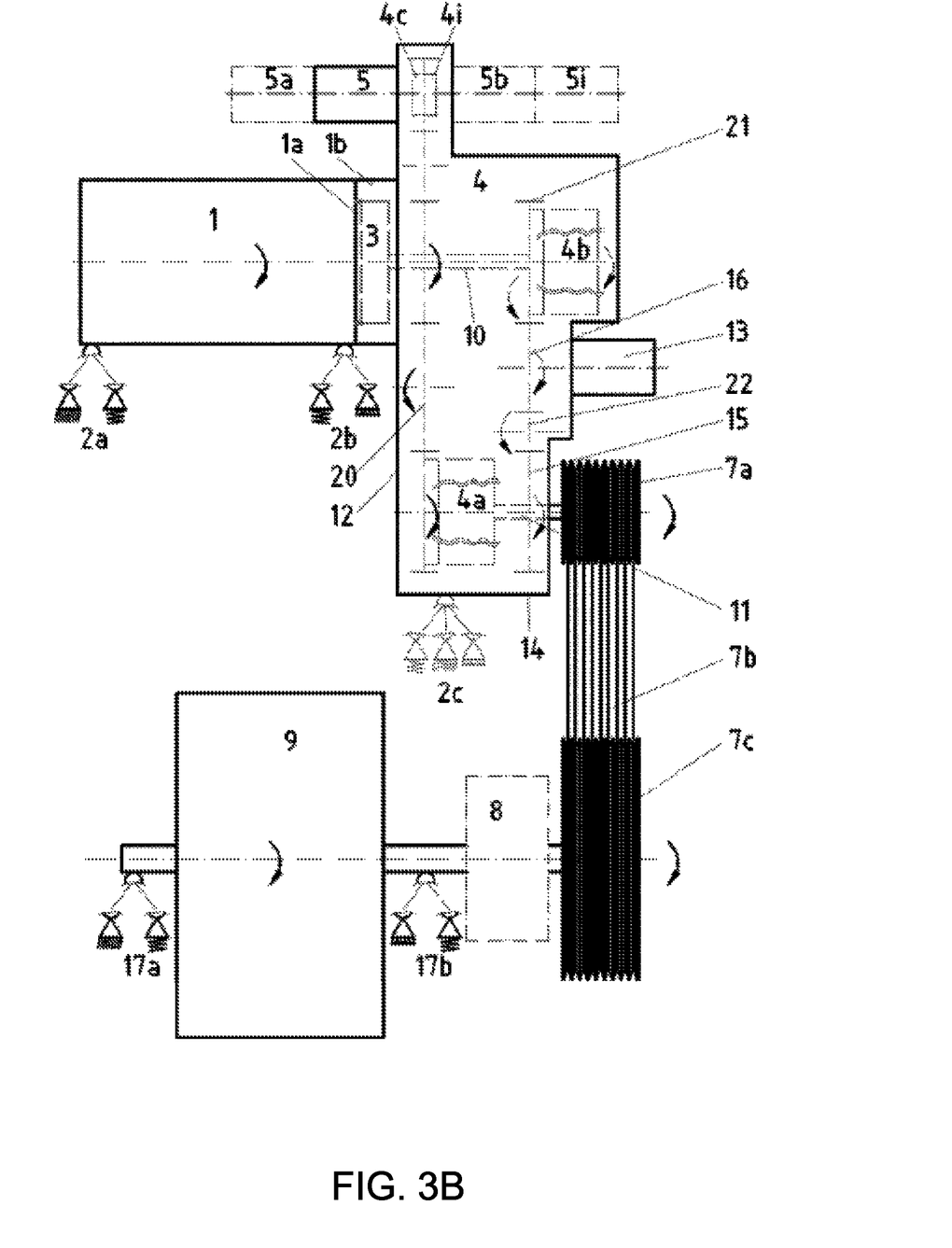
FIG. 3b shows a drive device according to the invention in a schematic illustration in a view "from above", with a crushing machine direction of rotation the same as a main drive direction of rotation.
Figure 3C:
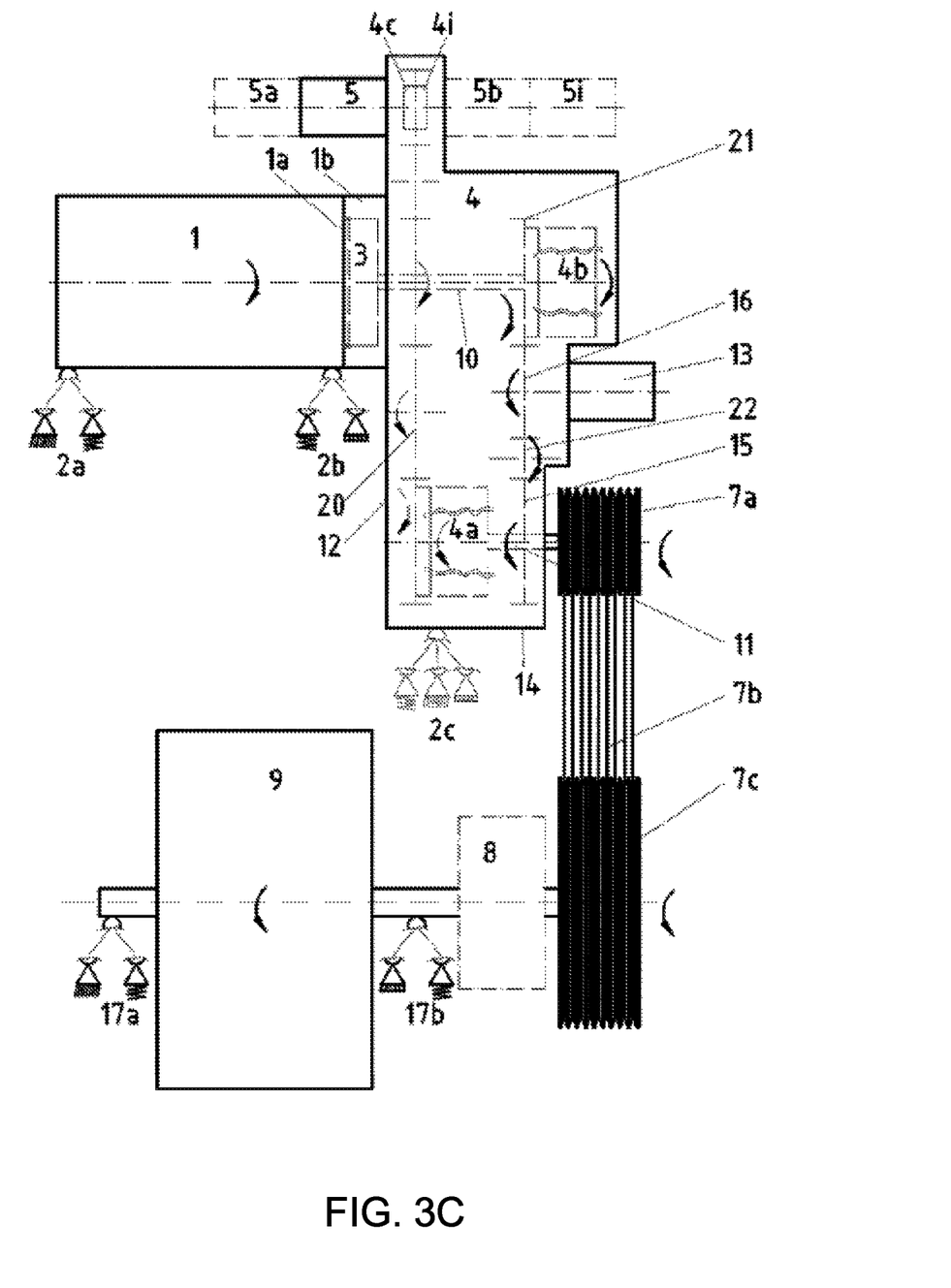
FIG. 3c shows a drive device according to the invention in a schematic illustration in a view "from above", with a crushing machine direction of rotation opposite to a main drive direction of rotation.

The following statements relate to the starting process with a work machine device as per FIGS. 3 to 3c, that is to say having two switchable clutches 4a and 4b upstream of the gearing output shaft:

To bring the work machine device from the rest state into the operating state, it is possible firstly for the main drive means, in particular the diesel engine, to be started. The switchable clutches are initially open. The main drive means can subsequently be run up to the activation rotational speed (for example idle rotational speed, "elevated" idle rotational speed, or the like) of the switchable clutches. In this state, the auxiliary drive, which may in particular be in the form of a hydraulic motor, is driven by one of the hydraulic pumps. The auxiliary drive can accelerate the work machine, from the output shaft of the gearing onward, with all components situated in between. The work machine may for example be designed as a crushing machine. When the auxiliary drive, in particular the hydraulic motor, has accelerated the gearing output shaft to the intended rotational speed, the activation rotational speed, one of the two switchable clutches can be activated. At the same time, the auxiliary drive can be deactivated. The switchable clutch can synchronize the already-rotating masses, from the gearing output shaft onward, with the motor rotational speed. Since said rotational speed difference is small or approaches zero, the switchable clutch is subjected to no thermal loading whatsoever or only low thermal loading. When the rotational speeds have synchronized, the main drive means can be run up to its operating rotational speed. The auxiliary drive can be decoupled.

Further advantageous refinements of the proposed invention will emerge in particular from the subclaims. The features of the subclaims may basically be combined with one another as desired.

In a further advantageous refinement of the work machine device according to the invention, it may be provided that the drive device and the work machine are connected to a transmission device for transmitting the rotational movement of the gearing output shaft to the work machine. The transmission device may for example be in the form of a belt drive, chain drive or else a simple shaft connection or gearing, for example gearwheel mechanism, in particular spur gear mechanism or planetary gear set. Every embodiment offers application-specific advantages. A belt drive requires no lubrication and no housing. It can generally be operated with a simple casing or even in an open configuration. Simpler installation and simpler exchange are possible in this way. A chain drive offers the advantage of a more compact construction in relation to the belt drive. The power density is also higher in relation to the belt drive. A gearwheel mechanism offers the advantage that it operates with particularly low wear. Also, replacement or maintenance intervals can be selected to be significantly longer. In this way, the effective service life is increased. A gearwheel mechanism also requires no tensioning device.

In a further advantageous refinement of the work machine device according to the invention, it may be provided that the transmission device has a V-pulley as transmission means of the drive device, a V-pulley as transmission means of the work machine, and one or more belts, arranged between the transmission means, as transmission element. Such a design of the transmission device as a belt drive is mentioned in particular in conjunction with a crushing machine as a work machine. By way of the belt drive, it is possible for the large axis spacings in a crushing machine to be bridged using simple means. The required transmission ratio can also be easily realized by way of the belt drive.

In a further advantageous refinement of the work machine device according to the invention, it may be provided that the auxiliary drive is designed for driving the work machine, in production operation, both in a first direction of rotation and a second, opposite direction of rotation. In other words, the auxiliary drive may also perform the task of the main drive, specifically in both directions of rotation, on a relatively long-term basis.

It is a further object of the present invention to propose an advantageous method for bringing a drive device from a rest state into an operating state.

Said object is achieved by means of a method, comprising the following method steps. Consideration is given both to the embodiments with one switchable clutch 4a as per FIGS. 1 to 2a and, between parentheses, to the embodiment with two switchable clutches 4a and 4b as per FIGS. 3 to 3c:
  the switchable clutch(es) are/is decoupled;
  the main drive means is started and run up to an activation rotational speed, in particular to an idle rotational speed or "elevated" idle rotational speed, of the switchable clutch(es);
  the auxiliary drive accelerates the gearing output shaft;
  when the auxiliary drive has accelerated the transmission output shaft to the intended activation rotational speed, the switchable clutch (4a or 4b) is activated and the auxiliary drive is deactivated.

By means of the method proposed here, it is possible for the drive device to be brought from the rest state into an operating state with very low wear, because the switchable clutch is subjected to virtually no loading.

It is a further object of the present invention to propose an advantageous method for bringing a work machine device from a rest state into an operating state.

Said object is achieved by means of a method, comprising the following method steps:
  the switchable clutch(es) are/is decoupled;
  the main drive means is started and run up to an activation rotational speed, in particular to an idle rotational speed or "elevated" idle rotational speed, of the switchable clutch(es);
  the auxiliary drive accelerates the gearing output shaft and at least the work machine;
  when the auxiliary drive has accelerated the transmission output shaft and the work machine to the intended activation rotational speed, the switchable clutch (4a or 4b) is activated and the auxiliary drive is deactivated.

By means of the method proposed here, the work machine device can be brought from the rest state into an operating state with very low wear, because the switchable clutch is subjected to virtually no loading.

It is a further object of the present invention to propose a method for eliminating undesired operating states, in particular for eliminating jamming of a connected work machine in a work machine device.

According to the invention, this is achieved by means of a method as follows. Consideration is given both to the embodiments with one switchable clutch 4a as per FIGS. 1 to 2a and, between parentheses, to the embodiments with two switchable clutches 4a and 4b as per FIGS. 3 to 3c. Undesired operating states, for example the jamming of the crushing machine, can be eliminated by virtue of the fact that the method comprises the following method steps:
  decoupling the switchable clutch(es);
  starting up the auxiliary drive (13) in a direction of rotation opposite to the direction of rotation predefined by the main drive means (1).

In summary, it can be stated that a drive device and a work machine device are proposed, wherein the gearing distributes the rotational movement of the main drive means basically to at least two strands, that is to say a first drivetrain for one or more hydraulic pumps and a second drivetrain that drives the gearing output shaft. The gearing output shaft in turn can drive the work machine itself, for example a crushing machine. With switching clutch(es) between the main drive and the gearing output shaft open, the gearing output shaft and downstream components, for example the work machine, can be accelerated by way of the auxiliary drive to a suitable rotational speed. In parallel with this, the main drive means can be accelerated to a synchronous or approximately synchronous rotational speed. It is substantially the case that the drive input rotational speed prevails at the drive input side of the switching clutch(es), whereas the rotational speed of the auxiliary drive prevails at the drive output side of the switching clutch(es). When said two rotational speeds are synchronous or approximately synchronous, the switching clutch can be closed without wear, or at least with low wear.

Likewise, the auxiliary drive offers the possibility of so-called "reversing", that is to say the gearing output shaft and correspondingly all downstream components can be driven in an opposite direction of rotation, whereby in particular a jammed crushing machine as work machine, for example owing to stones becoming jammed in the crushing machine, can be freed up again. Furthermore, the auxiliary drive may serve for relatively long-term operation in the opposite direction of rotation, in particular for a production process in a reverse direction of rotation.

BRIEF DESCRIPTION OF THE SEVERAL VIEWS OF THE DRAWING

Further features and advantages of the present invention will become clear on the basis of the following description of preferred exemplary embodiments with reference to the appended figures, in which.

The following reference signs are used in the figures:
1 Main drive means/diesel engine
1a Motor flywheel
1b Connection housing
2 Fastening element
3 Elastic coupling
4 Gearing
4a Switchable clutch
4b Switchable clutch
4c-4i Switchable clutches
5 Hydraulic pump
5a-5i Hydraulic pumps
6 —not used—
7a V-pulley
7b Belt
7c V-pulley
8 Further components, in particular shafts, Cardan shafts, shaft couplings, gearings, toothed couplings etc.
9 Work machine, in particular crushing machine
10 Gearing input shaft
11 Gearing output shaft
12 Housing
13 Auxiliary drive/hydraulic motor
14 Gearwheel stage/housing
15 First gearwheel, in particular spur gear
16 Second gearwheel, in particular spur gear
17 Bearing element
18 —not used—
19 Generator
20 Gearwheel
21 Third gearwheel, in particular spur gear
22 Fourth gearwheel, in particular spur gear

DESCRIPTION OF THE INVENTION

A drive device according to the invention comprises substantially a main drive means 1, a gearing 4 and an auxiliary drive 13, the gearing having a first drive output and at least one second drive output.

Furthermore, the drive device according to the invention comprises at least one hydraulic pump 5, a switchable clutch 4a and a transmission means, in particular a V-pulley 7a.

The drive device may furthermore comprise a generator 19.

The first drive output of the gearing 4 serves for the drive of the at least one hydraulic pump 5 and, if appropriate, of the further hydraulic pumps 5a to 5i. The second drive output of the gearing 4 serves the drive of the transmission means 7a and may for example be in the form of a gearing output shaft 11. The transmission means may for example be in the form of a V-pulley 7a and serves substantially for the coupling to and the drive of a work machine 9. The second drive output of the gearing or the gearing output shaft 11 is designed, correspondingly, for the drive of the work machine 9.

The gearing may have further drive outputs which, for example, drive the generator 19.

The switchable clutch 4a is connected into the second output drivetrain of the gearing 4. The switchable clutch 4a is connected upstream of the gearing output shaft 11 and can correspondingly activate and deactivate the gearing output shaft 11 and the transmission means 7a.

Furthermore, the drive device according to the invention may have in particular a connection housing 1b, a motor flywheel 1a, fastening elements 2a, 2b, 2c, an elastic coupling 3, a gearing input shaft 10, and a gearwheel stage 14 comprising in particular a first gearwheel 15 and a second gearwheel 16.

A work machine device that likewise conforms to the invention comprises substantially the drive device according to the invention and a work machine, in particular a crushing machine 9. Furthermore, the work machine device according to the invention comprises a transmission means which is compatible with the drive device, in particular a V-pulley 7c. Furthermore, the work machine device according to the invention may comprise bearing elements 17a, 17 and, if appropriate, further components 8, in particular shafts, Cardan shafts, shaft couplings, gearings, toothed couplings, etc.

The transmission means 7a of the drive device and the transmission means 7c assigned to the work machine 9 form, in particular together with a suitable transmission element, for example a belt 7b, a transmission device by which the rotational movement originating from the gearing, that is to say the associated gearing output shaft 11 of the gearing 4, can be transmitted to the work machine 9, that is to say to the input shaft thereof. In the example depicted here, the transmission device is in the form of a belt drive. Also conceivable are other transmission devices, such as for example a chain drive, correspondingly comprising two gearwheels as transmission means and an articulated chain as transmission element. It is for example also conceivable for the transmission device to be in the form of a simple shaft connection or gearing, for example gearwheel mechanism, in particular spur gear mechanism, or planetary gear set.

The auxiliary drive 13, which may for example be in the form of a hydraulic motor, pneumatic motor or electric motor, is connected, for example by way of a gearwheel mechanism 15, 16, to the gearing output shaft 11 of the gearing.

Further details of the proposed invention will emerge in particular from the further statements regarding the function of the drive device or work machine device. The drive device or work machine device is generally implemented with a diesel engine or with an electric motor as main drive means. Other main drive means are however also possible. The following description is based on the example of a "diesel engine as a drive machine" (see FIG. 1). Furthermore, the description is based on the example of a hydraulic motor as an auxiliary drive, wherein other auxiliary drives are also conceivable here.

In order, without the use of control technology measures, to make the start-up process in the case of drive devices and/or work machine devices in which high demands (for example high mass inertias to be accelerated, long slippage times, high load torques, etc.) are placed on frictionally engaging switching clutches (so-called "heavy start-up") more reliable for the components that are used, the drive concept described below has been developed.

The gearing 4 is flange-mounted directly on the connection housing 1b of the diesel engine 1. The diesel engine 1 is fastened for example to the frame of a mobile construction machine (not illustrated) by corresponding fastening elements 2a/2b. The gearing 4 may optionally likewise be fastened to the frame of the construction machine by way of corresponding fastening elements 2c. The elastic coupling 3 may be flange-mounted on the motor flywheel 1a, the elastic coupling in turn being arranged on the gearing input shaft 10 of the gearing 4. The elastic coupling 3 has substantially both the function of a "damping coupling" and the function of a "compensation coupling". The objectives thereof are thus those of dampening vibrations in the circumferential direction (torque peaks) and compensating alignment errors between the diesel engine 1 and gearing 4. The driving gearwheel for the "pump strand"/"pump strands" is situated on the gearing input shaft 10 of the gearing 4. The number and type of hydraulic pump(s) 5/5a to 5i and the connection geometries thereof is specific to the application, and may thus vary significantly. The pump strands can be activated or deactivated with the aid of switchable clutches 4c to 4i which may be arranged within or outside the gearing 4. In this way, the energy balance of the drive device or work machine device can be optimized because the hydraulic pumps that are not presently required can be deactivated and thus do not generate any power losses.

The torque flow between the gearing input shaft 10 and the gearing output shaft 11 of the gearing 4 can be interrupted and established by way of a switchable clutch 4a. The mode of actuation of the switchable clutches 4a/4b to 4i is not relevant for the function here and may thus be selected as desired. Common modes of actuation are hydraulic or pneumatic pressure, electromagnetic force, spring force, mechanical actuation etc. The following descriptions relate to clutches that are actuated by way of hydraulic pressure.

The gearing input shaft 10 and also the gearing output shaft 11 are mounted in the housing 12 of the gearing 4 by way of bearings. A first V-pulley 7a is mounted on the gearing output shaft 11 of the gearing 4. The belt drive 7a, b and c can now, as shown by way of example in FIG. 1, drive a work machine, for example a crushing machine 9, by way of a second V-pulley 7c. Further components 8, such as for example shafts, Cardan shafts, shaft couplings, gearings, toothed couplings etc. may be arranged between the driven V-pulley 7c and the work machine 9. The work machine 9 itself may in turn be fastened for example to the frame of the machine by way of corresponding bearing elements 17a/17b. Between the switchable clutch 4a and the first V-pulley 7a there is situated a further gearwheel stage 14, the first gearwheel 15 of which is connected to the gearing output shaft 11. The auxiliary drive 13 is connected to the second gearwheel 16 of said gearwheel stage 14.

The start-up process may take place as follows.

In the rest state of the drive device and/or of the work machine device, the components that are used are in the following state. The diesel engine 1 is not started, the switchable friction clutch 4a is open, that is to say unpressurized, and the torque flow between the gearing input and output is thus interrupted, the work machine is preferably free from load torque (in the example described, the crushing machine 9 is thus empty), and also, the optional, switchable clutches 4c to 4i may be open.

To bring the drive device and/or work machine device from the rest state into the operating state, it is now firstly the case that the main drive means 1 is started. Said main drive means is subsequently run up to the activation rotational speed (for example idle rotational speed, "elevated" idle rotational speed, or the like) of the switchable clutch 4a. In this state, the auxiliary drive, in particular the hydraulic motor 13, is driven by one of the hydraulic pumps, for example one of the pumps 5 to 5i. The hydraulic motor 13 accelerates the crushing machine 9, from the gearing output shaft 11 onward, with all components situated in between. When the hydraulic motor 13 has accelerated the gearing output shaft 11 to the intended rotational speed, the activation rotational speed, the switchable clutch 4a is activated. At the same time, the hydraulic motor 13 is deactivated. The switchable clutch 4a must synchronize the already-rotating masses, from the gearing output shaft 11 onward, with the motor rotational speed. Since said rotational speed difference is small or approaches zero, the switchable clutch 4a is subjected to no thermal loading whatsoever or only low thermal loading. When the rotational speeds have synchronized, the main drive means 1 can be run up to its operating rotational speed. In this state, the hydraulic motor 13 is subjected to different hydraulic function, such that it can now operate as an additional hydraulic pump.

In the case of hydraulically actuated clutches, the supply of switching and/or cooling oil to the switchable clutch 4a or 4b and also to the optional switching clutches 4c to 4i can preferably be realized by way of hydraulic pumps that are fastened to the gearing 4. The unit comprising gearing 4 and switchable clutches 4a/4b and 4c to 4i is thus an autonomous assembly. Beforehand, in this state or even subsequently, it is possible for individual, multiple or all of the optional, switchable clutches 4c to 4i to be activated in order to drive the hydraulic pump(s) 5/5a to 5i. This is dependent on the application itself but also on the mode of operation thereof, and will not be described explicitly here.

From this combination of the individual components, in particular elastic coupling 3 (optional), gearing 4 with switchable clutch 4a, switchable clutch(es) 4c to 4i (optional), hydraulic motor 13 and a mounted V-pulley 7a, a unit has been developed with which work machines can be driven in an activatable and also deactivatable fashion. The unit may, through skilful selection of the individual components and the actuation thereof, be adapted such that each individual component is subject to only low thermal loading and can thus be expected to exhibit a long, reliable and economical service life.

The unit described thus far is a constituent part of a modular system; that is to say that, in the case of drive devices and/or work machine devices in which relatively low loading states, in particular relatively low mass moments of inertia to be accelerated, absent or only low load torques, etc., it is also possible to effect the start-up process only by way of the switchable friction clutch 4a. In this case, the additional gearwheel stage 14 can be omitted from the unit. The modular system also makes it possible to use or dispense with an elastic coupling 3 and/or the switchable clutches 4c to 4i for the activation or deactivation of the hydraulic pump(s).

The reversing of the drive device, that is to say the reversal of the direction of rotation of the gearing output shaft 11, is performed substantially by reversal of the direction of rotation of the auxiliary drive 13, wherein the switchable clutch 4a should be decoupled beforehand. In this way, it is possible to eliminate undesired operating states, in particular jamming of a connected work machine in a work machine device. Furthermore, the auxiliary drive may serve for relatively long-term operation in an opposite direction of rotation, in particular for a production process in a reverse direction of rotation.

One embodiment of the invention relates to a drive device comprising at least a main drive means 1, a gearing 4, a hydraulic pump 5, a switchable clutch 4a and a V-pulley 7a, wherein the main drive means 1 is designed for driving the gearing 4, wherein the gearing 4 is designed at least for driving the hydraulic pump 5 and for driving the switchable clutch 4a, wherein the switchable clutch 4a is designed for driving the V-pulley 7a, wherein the drive device is equipped with an auxiliary drive 13, wherein the auxiliary drive 13 is designed for driving the V-pulley 7a, and to a work machine device, comprising a drive device according to the invention and a work machine 9.

A further embodiment of the drive device or work machine device according to the invention is illustrated in FIGS. 3 to 3c.

The further embodiment, illustrated here, of the drive device or work machine device according to the invention comprises a reversing device for the main drive means. The reversing device for the main drive means comprises substantially a further switchable clutch 4b, a third gearwheel 21 and a fourth gearwheel 22. Said additional components make it possible for the gearing output shaft 11 to be driven selectively in two directions of rotation by the main drive means, that is to say the diesel engine.

In this description, the specification of the direction of rotation is based on the viewing direction from the gearing 4 to the motor 1.

The motor flywheel 1a is, in this example, always driven anticlockwise. Consequently, the gearing input shaft 10 also rotates anticlockwise. When the switchable clutch 4a situated on the gearing output shaft 11 is closed and the switchable clutch 4b situated on the gearing input shaft 10 is open, the gear train between gearing input shaft 10 and switchable clutch 4a transmits the power from the diesel engine 1 to the gearing output shaft 11. Here, the gearwheel 20 rotates clockwise and the gearing output shaft 11 rotates anticlockwise. The gearwheel 15 thus also runs anticlockwise and, via the gearwheel 22, which rotates clockwise, the gearwheel 15, which rotates anticlockwise, drives the gearwheel on the switchable clutch 4b, which rotates clockwise. The gearwheel on the switchable clutch 4b is mounted on the gearing input shaft 10 and does not transmit any power when the clutch is open.

When the switchable clutch 4b situated on the gearing input shaft 10 is closed and the switchable clutch 4a situated on the gearing output shaft 11 is open, the gear train between switchable clutch 4b and gearing output shaft 11 transmits the power from the diesel engine 1. The motor flywheel 1a is, in this example, always driven anticlockwise. Consequently, the gearing input shaft 10 and the gearwheel 21 on the switchable clutch also rotate anticlockwise. Said gearwheel drives the gearwheel 15 and thus the gearing output shaft 11 clockwise via the gearwheel 16, which rotates clockwise, and the gearwheel 22, which rotates anticlockwise. Since the gearwheel on the switchable clutch 4a is mounted on the gearing output shaft 11, no power is transmitted when the clutch 4a is open. The gear train between gearing input shaft 10 and switchable clutch 4a runs concomitantly without power.

Depending on the direction in which the hydraulic motor 13 accelerates the gearing output shaft 11 and the masses situated downstream thereof, it is possible, with the targeted switching of one of the two clutches 4a or 4b, for the direction of rotation of the gearing output shaft 11 and thus of the work machine 9 to be controlled in the case of an unchanging drive direction of rotation of the diesel engine 1.

The reversing device for the main drive means is formed substantially by two gear trains with in each case one switching clutch per gear train, wherein the gear trains have different numbers of gearwheels. The gear trains ultimately need not imperatively involve gearwheels; belt drives or other suitable transmission devices may also be used for this purpose.

The invention claimed is:

1. A drive device, comprising:
 at least one hydraulic pump;
 a gearing;
 a first drive output connected to said gearing and at least one second drive output connected to said gearing, said first drive output being configured to drive said at least one hydraulic pump, and said second drive output being constructed as a gearing output shaft configured to drive a work machine, said gearing output shaft being disposed between said gearing and said work machine;
 at least one switchable clutch connecting said gearing output shaft to said gearing;
 a main drive device configured to drive said gearing; and
 an auxiliary drive configured to drive said gearing output shaft.

2. The drive device according to claim 1, wherein said auxiliary drive is configured to be operated selectively in a first direction of rotation and in a second, opposite direction of rotation.

3. The drive device according to claim 2, wherein said first direction of rotation is forwards and said second, opposite direction of rotation is backwards.

4. The drive device according to claim 1, wherein said auxiliary drive is selected from the group consisting of a hydraulic motor, a pneumatic motor and an electric motor.

5. The drive device according to claim 1, wherein said auxiliary drive is configured to operate selectively as a hydraulic motor or as a hydraulic pump.

6. The drive device according to claim 1, wherein said main drive device is a diesel engine or an electric motor.

7. The drive device according to claim 1, which further comprises at least one further hydraulic pump configured to be driven by said gearing.

8. The drive device according to claim 1, which further comprises other switchable clutches configured to selectively activate or deactivate said at least one hydraulic pump.

9. The drive device according to claim 1, which further comprises at least one of a motor flywheel or an elastic coupling disposed between said main drive device and said gearing.

10. The drive device according to claim 1, which further comprises a reversing device for said main drive device, said reversing device being configured to allow said gearing output shaft to rotate in different directions of rotation with an unchanging direction of rotation of said main drive device, said reversing device including at least one further switchable clutch.

11. A work machine device, comprising:
 the drive device according to claim 1 for driving said work machine.

12. The work machine device according to claim 11, which further comprises a transmission device connected to said drive device and to said work machine for transmitting a rotational movement of said gearing output shaft to said work machine.

13. The work machine device according to claim 12, wherein said transmission device includes:
   a V-pulley configured as a transmission of said drive device,
   a V-pulley configured as a transmission of said work machine, and
   at least one belt configured as a transmission element disposed between said transmissions.

14. The work machine device according to claim 11, wherein said auxiliary drive is configured to drive said work machine, in production operation, both in a first direction of rotation and in a second, opposite direction of rotation.

15. A method for bringing a drive device from a rest state into an operating state, the method comprising the following steps:
   providing the drive device with:
      at least one hydraulic pump;
      a gearing;
      a first drive output connected to the gearing and at least one second drive output connected to the gearing, the first drive output being configured to drive the at least one hydraulic pump, and the second drive output being constructed as a gearing output shaft configured to drive a work machine, the gearing output shaft being disposed between the gearing and the work machine;
      at least one switchable clutch connecting the gearing output shaft to the gearing;
      a main drive device configured to drive the gearing; and
      an auxiliary drive configured to drive the gearing output shaft;
   decoupling the at least one switchable clutch;
   starting and running-up the main drive device to an activation rotational speed of the at least one switchable clutch;
   accelerating the gearing output shaft using the auxiliary drive; and
   activating the at least one switchable clutch and deactivating the auxiliary drive when the auxiliary drive has accelerated the transmission output shaft to an intended activation rotational speed.

16. The method according to claim 15, wherein the activation rotational speed is an idle rotational speed or an elevated idle rotational speed of the at least one switchable clutch.

17. A method for bringing a work machine device from a rest state into an operating state, the method comprising the following steps:
   providing the work machine device with a work machine and a drive device for driving the work machine;
   providing the drive device with:
      at least one hydraulic pump;
      a gearing;
      a first drive output connected to the gearing and at least one second drive output connected to the gearing, the first drive output being configured to drive the at least one hydraulic pump, and the second drive output being constructed as a gearing output shaft configured to drive the work machine, the gearing output shaft being disposed between the gearing and the work machine;
      at least one switchable clutch connecting the gearing output shaft to the gearing;
      a main drive device configured to drive the gearing; and
      an auxiliary drive configured to drive the gearing output shaft;
   decoupling the at least one switchable clutch;
   starting and running-up the main drive device to an activation rotational speed of the at least one switchable clutch;
   accelerating the gearing output shaft and at least the work machine using the auxiliary drive; and
   activating the switchable clutch and deactivating the auxiliary drive when the auxiliary drive has accelerated the transmission output shaft and the work machine to an intended activation rotational speed.

18. The method according to claim 17, wherein the activation rotational speed is an idle rotational speed or an elevated idle rotational speed of the at least one switchable clutch.

19. A method for eliminating undesired operating states including eliminating jamming of a connected work machine in a work machine device, the method comprising the following steps:
   providing the work machine device with a work machine and a drive device for driving the work machine;
   providing the drive device with:
      at least one hydraulic pump;
      a gearing;
      a first drive output connected to the gearing and at least one second drive output connected to the gearing, the first drive output being configured to drive the at least one hydraulic pump, and the second drive output being constructed as a gearing output shaft configured to drive the work machine, the gearing output shaft being disposed between the gearing and the work machine;
      at least one switchable clutch connecting the gearing output shaft to the gearing;
      a main drive device configured to drive the gearing; and
      an auxiliary drive configured to drive the gearing output shaft;
   decoupling the at least one switchable clutch; and
   starting up the auxiliary drive in a direction of rotation opposite to a direction of rotation predefined by the main drive device.

* * * * *